(12) United States Patent
Hyodo

(10) Patent No.: US 12,189,247 B2
(45) Date of Patent: Jan. 7, 2025

(54) LIQUID CRYSTAL DISPLAY DEVICE

(71) Applicant: Japan Display Inc., Tokyo (JP)

(72) Inventor: Yosuke Hyodo, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/346,308

(22) Filed: Jul. 3, 2023

(65) Prior Publication Data
US 2024/0012301 A1 Jan. 11, 2024

(30) Foreign Application Priority Data
Jul. 11, 2022 (JP) .................. 2022-111118

(51) Int. Cl.
| | | |
|---|---|---|
| *G02F 1/1347* | (2006.01) | |
| *G02F 1/1339* | (2006.01) | |
| *G02F 1/1368* | (2006.01) | |

(52) U.S. Cl.
CPC .......... *G02F 1/1347* (2013.01); *G02F 1/1339* (2013.01); *G02F 1/1368* (2013.01); *G02F 2202/28* (2013.01)

(58) Field of Classification Search
CPC ......... G02F 1/133528; G02F 1/133531; G02F 2001/133545; G02F 1/13471; B29D 11/00644; B32B 2307/42; G02B 5/3025
See application file for complete search history.

(56) References Cited

U.S. PATENT DOCUMENTS

| | | | | |
|---|---|---|---|---|
| 5,329,387 A | * | 7/1994 | Yanagisawa | ........ G02F 1/13471 349/181 |
| 2005/0280635 A1 | * | 12/2005 | Hinata | .................. G02F 1/1333 349/40 |
| 2009/0086150 A1 | * | 4/2009 | Koyama | ........... G02F 1/133512 359/462 |
| 2022/0187643 A1 | * | 6/2022 | Hyodo | .................. G02F 1/1347 |
| 2022/0269116 A1 | * | 8/2022 | Deng | ................. G02F 1/133531 |
| 2023/0096807 A1 | * | 3/2023 | Yang | ................. G02F 1/133531 349/56 |

FOREIGN PATENT DOCUMENTS

| | | |
|---|---|---|
| JP | 2002-131775 A | 5/2002 |
| JP | 4784001 B2 * | 9/2011 |

OTHER PUBLICATIONS

English translation for JP-4784001-B2, Ueda (Year: 2011).*

* cited by examiner

*Primary Examiner* — Jonathan Y Jung
(74) *Attorney, Agent, or Firm* — Michael Best & Friedrich LLP

(57) ABSTRACT

An LCD includes a first LC panel with a first TFT substrate and a first counter substrate adhered together with a first sealing layer, first and second polarizers bonded to lower and upper surfaces of the first LC panel, a second LC panel with a second TFT substrate and a second counter substrate adhered together with a second sealing layer, and third and fourth polarizers bonded to lower and upper surfaces of the second LC panel. The first and second LC panels are arranged overlapping each other. The second counter substrate and the first TFT substrate are adhered together at their peripheral portions with a third sealing layer. The first and fourth polarizers are arranged on an inner side of the third sealing layer. The first and fourth polarizers are adhered together with an adhesive layer, or a high refractive oil exists between the first and fourth polarizers.

15 Claims, 10 Drawing Sheets

LIQUID CRYSTAL DISPLAY DEVICE

CLAIM OF PRIORITY

The present application claims priority from Japanese Patent Application JP 2022-111118 filed on Jul. 11, 2022, the content of which is hereby incorporated by reference into this application.

BACKGROUND OF THE INVENTION

1. Field of the Invention

The present invention relates to a liquid crystal display device, which realizes high contrast images using a plurality of overlapping liquid crystal display panels.

2. Description of the Related Art

In a liquid crystal display device, a liquid crystal is held between a TFT substrate, on which pixel electrodes, thin-film transistors (TFTs), and the like are formed in a matrix, and a counter substrate arranged opposite to the TFT substrate. An image is formed by controlling pixel by pixel the transmittance of light through liquid crystal molecules.

To provide a liquid crystal display device with an improved contrast ratio, it is known to use a brightness control panel, which performs only control of brightness, in superimposition with a display panel. At areas to be dimmed, light from a backlight is therefore blocked by the brightness control panel to realize a deeper black color.

Japanese patent application laid open No. 2002-131775 describes configurations to realize high contrast images by arranging and overlapping two liquid crystal display panels. Japanese patent application laid open No. 2002-131775 also describes an assembly method for overlapping the two liquid crystal display panels.

SUMMARY OF THE INVENTION

As it is only polarized light that a liquid crystal can control, polarizers are used by bonding them to a lower side and an upper side of a liquid crystal display panel, respectively. Each polarizer has the structure that a polarizing layer with an iodine compound, for example, an iodine (I) compound impregnated in polyvinyl alcohol (PVA) is held between protective layers of cellulose triacetate (TAC) or the like.

A liquid crystal display panel that displays images may hereinafter also be referred to as "display panel," while a liquid crystal display panel that locally controls brightness may hereinafter also be referred to as "brightness control panel." When the display panel and the brightness control panel are adhered together with the display panel arranged on an upper side and the brightness control panel arranged on a lower side, the lower polarizer of the display panel and the upper polarizer of the brightness control panel are adhered together.

TAC that makes up the protective layers of each polarizer has hygroscopicity. Incidentally, PVA that makes up each polarizing layer is prone to change in quality if moisture exists. Moreover, further application of heat accelerates the quality change, leading to a reduction in transmittance and/or occurrence of unevenness in transmittance. When the display panel and the brightness control panel are used overlapping each other, two polarizers overlap. This means that there are two overlapping sets of a configuration in which two layers of highly hygroscopic TAC exist with an adhesive interposed therebetween, and that the humidity becomes high there. The polarizing layers made from PVA are then deteriorated, so that the quality of images is lowered.

With the foregoing problem in view, the present invention therefore has, as an object thereof, the provision of a liquid crystal display device that is high in the contrast of images and is also high in reliability.

To solve the above-described problem, the present invention provides the following liquid crystal display devices.

(1) A liquid crystal display device including a first liquid crystal panel with a first thin-film transistor substrate and a first counter substrate adhered together with a first sealing layer, a first polarizer bonded to a lower surface of the first liquid crystal panel, a second polarizer bonded to an upper surface of the first liquid crystal panel, a second liquid crystal panel with a second thin-film transistor substrate and a second counter substrate adhered together with a second sealing layer, a third polarizer bonded to a lower surface of the second liquid crystal panel, and a fourth polarizer bonded to an upper surface of the second liquid crystal panel. The first liquid crystal panel and the second liquid crystal panel are arranged overlapping each other. The second counter substrate and the first thin-film transistor substrate are adhered together at peripheral portions thereof with a third sealing layer. The first polarizer and the fourth polarizer are arranged on an inner side of the third sealing layer, and the first polarizer and the fourth polarizer are adhered together with an adhesive layer.

(2) A liquid crystal display device including a first liquid crystal panel with a first thin-film transistor substrate and a first counter substrate adhered together with a first sealing layer, a first polarizer bonded to a lower surface of the first liquid crystal panel, a second polarizer bonded to an upper surface of the first liquid crystal panel, a second liquid crystal panel with a second thin-film transistor substrate and a second counter substrate adhered together with a second sealing layer, a third polarizer bonded to a lower surface of the second liquid crystal panel, and a fourth polarizer bonded to an upper surface of the second liquid crystal panel. The first liquid crystal panel and the second liquid crystal panel are arranged overlapping each other. The second counter substrate and the first thin-film transistor substrate are adhered together at peripheral portions thereof with a third sealing layer. The first polarizer and the fourth polarizer are arranged on an inner side of the third sealing layer, and a high refractive oil exists between the first polarizer and the fourth polarizer.

DETAILED DESCRIPTION OF THE PREFERRED EMBODIMENTS

With reference to the accompanying drawings, a description will hereinafter be made in detail about a first embodiment and a second embodiment of the present invention.

Before describing the first and second embodiments of the present invention, a description will first be made about the configurations of a general liquid crystal display device having a brightness control panel with reference to FIGS. 1 to 4.

Figure 1:
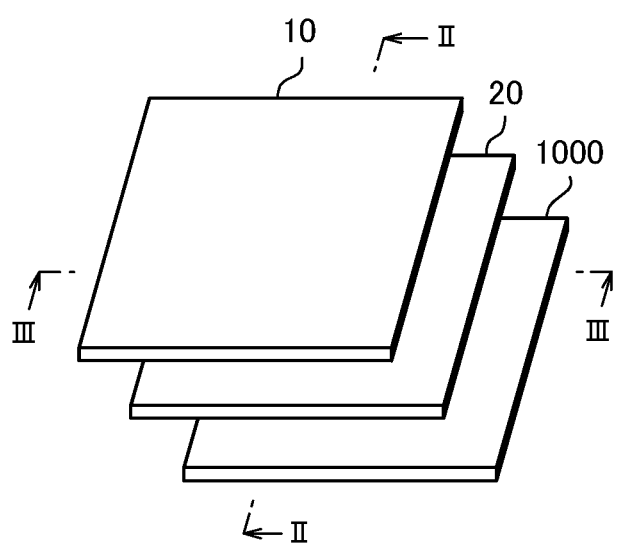
FIG. 1 is an exploded perspective view of a general liquid crystal display device having a brightness control panel.

FIG. 1 is an exploded perspective view of the general liquid crystal display device having a brightness control panel. In FIG. 1, a first liquid crystal display panel 10 (hereinafter referred to as "the display panel 10") and a second liquid crystal display panel 20 (hereinafter referred to as "the brightness control panel 20") are used overlapping each other. A backlight 1000 is arranged behind the brightness control panel 20. This technology may also be referred to as "local dimming." Described specifically, areas to be dimmed in an image is irradiated with no light. This can realize very high contrast images.

Liquid crystal panels of the same configuration may be used as the display panel 10 and the brightness control panel 20. However, the specification of the display panel and that of the brightness control panel 20 are made different in parts to improve the brightness and quality of images to be displayed on a screen as the whole display. For example, to improve the brightness of the screen in its entirety, no color filter is used in the brightness control panel 20. Further, to prevent interference such as the moire effect between the display panel 10 and the brightness control panel 20, a measure may also be taken, such as making the configuration of wirings different between the display panel 10 and the brightness control panel 20.

Figure 2:
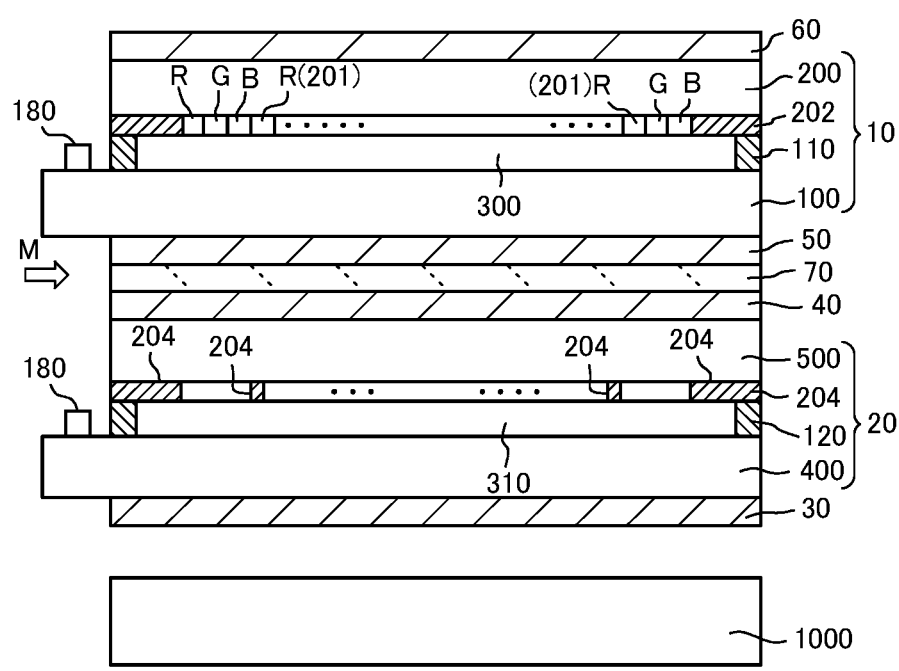
FIG. 2 is a II-II cross-sectional view of FIG. 1.

FIG. 2 is a II-II cross-sectional view of FIG. 1, in which the configurations of FIG. 1 have been assembled. In FIG. 2, the display panel 10 arranged on an upper side is configured with a first TFT substrate 100, on which wirings and TFTs are formed, and a first counter substrate 200, a first liquid crystal layer 300 is held between the first TFT substrate 100 and the first counter substrate 200, and light from the backlight 1000 is controlled pixel by pixel.

The first TFT substrate 100 and the first counter substrate 200 are adhered together along peripheries thereof with a first sealing layer 110. The first sealing layer 110 is formed with as small a width as possible to an extent that can maintain the reliability of the adhesion. As it is only polarized light that a liquid crystal can control, a lower polarizer 50 (hereinafter referred to as "the first polarizer 50") is arranged on a lower side of the display panel 10, and an upper polarizer 60 (hereinafter referred to as "the second polarizer 60") is arranged on an upper side of the display panel 10.

The first TFT substrate 100 is formed to be greater than the first counter substrate 200, and on a portion of the first TFT substrate 100 where the first TFT substrate 100 does not overlap the first counter substrate 200, a terminal area is formed. On the terminal area, a first IC driver 180, which is for driving the display panel 10, and the like are arranged. On a portion of the first counter substrate 200 where the first counter substrate 200 overlaps the first TFT substrate 100, on the other hand, a display area is formed.

In FIG. 2, color filters 201 are formed on the first counter substrate 200 to form color images. Rs represent red color filters, Gs denote green color filters, and Bs stand for blue color filters. First light-shielding layers 202 are formed between the respective color filters and on a frame area around the display area, although the first light shielding layers 202 between the respective color filters are now shown in FIG. 2.

The first light shielding layers 202 have a role in improving the contrast of images at the display area. As many wirings such as scanline leads and a scanline driver circuit concentrate at the peripheral frame area, shielding of light is needed to prevent reflection or the like of light from these wirings. As a light shielding film for the frame area, the first light shielding layer 202 is hence formed. The first light shielding layer 202 at the frame area, that is, the frame area is formed with a width greater than that of the first spieling layer 110 because the first light shielding layer 202 needs light shielding with respect to the many peripheral wirings.

In FIG. 2, the brightness control panel 20 is arranged on a lower side of the display panel 10. The brightness control panel 20 has fundamentally the same structure as the display panel 10 except for the pixel structure at a display area. Described specifically, a second TFT substrate 400, on which wirings, TFTs, and the like are formed, and a second counter substrate 500 opposes to each other, and a second liquid crystal layer 310 exists between the second TFT substrate 400 and the second counter substrate 500. The second TFT substrate 400 and the second counter substrate 500 are adhered together with a second sealing layer 120. Similar to the first sealing layer 110 on the side of the display panel 10, the second sealing layer 120 has a small width. On a lower side of the second TFT substrate 400, a lower polarizer 30 (hereinafter referred to as "the third polarizer 30") is arranged.

The second TFT substrate 400 is formed to be greater than the second counter substrate 500, and on a portion of the second TFT substrate 400 where the second TFT substrate 400 is exposed from the second counter substrate 500, a terminal area is formed. At the terminal area, a second driver IC 182 and the like, which are for driving the display panel, are arranged. On a portion of the second counter substrate 500 where the second counter substrate 500 overlaps the second TFT substrate 400, on the other hand, the display area is formed.

No color filters are formed on the second counter substrate 500 of the brightness control panel 20. This is to avoid a reduction in the light transmittance of the brightness control panel 20. However, second light shielding layers 204 are also formed on the second counter substrate 500 of the brightness control panel 20 as in the first counter substrate 200 of the display panel 10, because, similar to the display panel 10, the brightness control panel 20 also needs to shield light from the wiring area around the display area. In the brightness control panel 20, the second light shielding layer 204 at the peripheral area, in other words, the frame area also has a width greater than the second sealing layer 120.

At the display area of the brightness control panel on the other hand, brightness signal lines are formed in place of video signal lines at the display area of the display panel 10, and the second light shielding layers 204 are formed in registration with the brightness signal lines. This is to prevent reflection of light from the brightness signal lines. As the brightness signal lines are formed at a pitch greater than the video signal lines at the display area of the display panel 10, the second light shielding layers 204 at the display area of the brightness control panel 20 are also formed at a pitch greater than the first light shielding layers 202 in the display panel 10.

In FIG. 2, the display panel 10 and the brightness control panel 20 are adhered together with an adhesive, for example, an optical clear adhesive (OCA). Described specifically, the first polarizer 50 of the display panel and an upper polarizer 40 (hereinafter referred to as "the fourth polarizer 40") of the brightness control panel are adhered together with an adhesive layer 70. OCA that forms the adhesive layer 70 (which may hereinafter be referred to as "the OCA 70") is an acrylic resin, a silicone-based resin, or the like, and therefore is prone to absorb moisture.

In FIG. 2, the backlight 1000 is arranged on a back surface of the brightness control panel 20. LED arrays are used in the backlight 1000. LEDs can provide high brightness, but on the other hand, give off a great deal of heat. This heat passes through the brightness control panel 20, and reaches the two polarizers 40 and 50, and the OCA 70 between the brightness control panel 20 and the display panel 10. The polarizing layer in each polarizer is merely held with between the protective layers of cellulose triacetate (TAC) that is prone to absorb moisture, and therefore is exposed to moisture and heat. Accordingly, the deterioration of polyvinyl alcohol (PVA) that makes up each polarizing layer proceeds.

Figure 3:
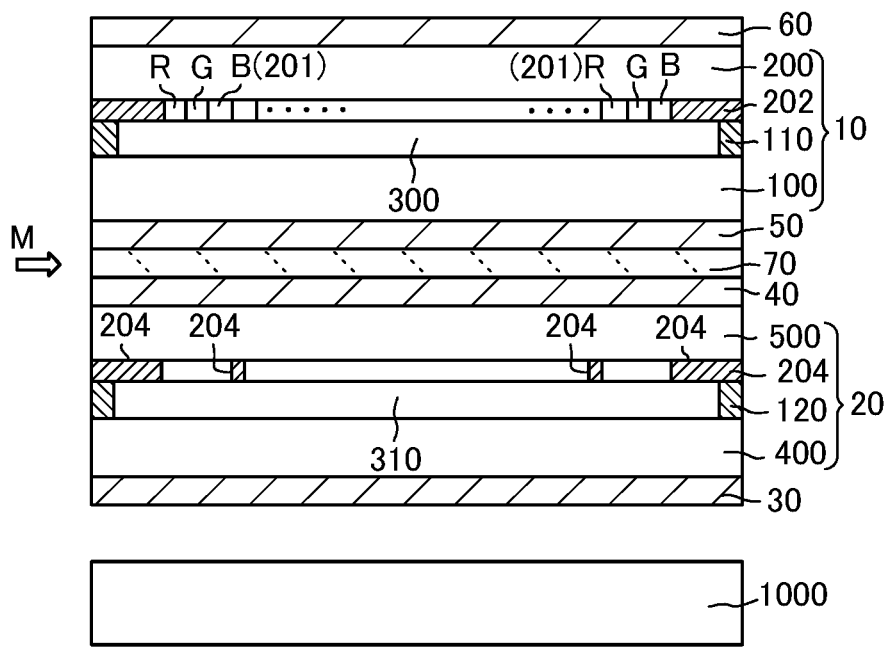
FIG. 3 is a III-III cross-sectional view of FIG. 1.

FIG. 3 is a III-III cross-sectional view of FIG. 1. FIG. 3 is basically the same as FIG. 2 except that no terminal areas exist. It is to be noted that the pixel construction of the color filters formed on the first counter substrate 200 of the display panel 10 is not exactly the same as that in the II-II cross-section and III-III cross-section, but is drawn as the same structure in FIGS. 2 and 3 to facilitate its understanding because FIGS. 2 and 3 are schematic views. This equally applies to the construction of pixels defined and isolated by the first light shielding layers 202 in the display panel 10. Other configurations are similar to those described above with reference to FIG. 2, and the description is omitted accordingly.

As shown in FIGS. 2 and 3, the display panel 10 and the brightness control panel 20 are adhered together with the OCA 70. Described specifically, the fourth polarizer 40 bonded to the brightness control panel 20 and the first polarizer 50 bonded to the display panel 10 are adhered together with the OCA 70. The polarizers 40 and 50 are formed with resins, and the OCA 70 itself is a resin, so that polarizers 40 and 50, and OCA 70 are prone to absorb moisture.

Accordingly, the plural layers that are prone to absorb moisture overlap near the OCA 70. If moisture penetrates from side surfaces of the polarizers 40 and 50, and OCA 70 as indicated by an open thick arrow M as shown in FIGS. 2 and 3, the moisture tends to stay in the polarizers 40 and 50, and the like, and the deterioration of the polarizers 40 and 50 thus proceeds in the presence of this moisture.

Figure 4:
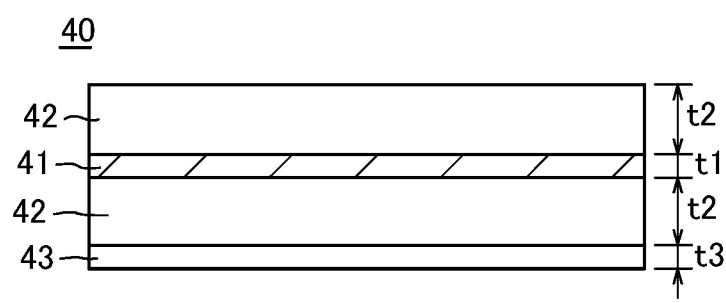
FIG. 4 is a cross-sectional view of a fourth polarizer of the liquid crystal display device of FIG. 1.

FIG. 4 is a cross-sectional view of the fourth polarizer 40 that exemplifies the structure of a polarizer. The fourth polarizer 40 has a configuration that a polarizing layer 41 having polarizing effects is held between protective layers 42, and a self-adhesive layer 43 is formed on one of the protective layers 42, specifically, the lower protective layer 42 as seen in FIG. 4 to bond the lower protective layer 42 with the second counter substrate 500 of the brightness control panel 20. The remaining polarizers, that is, the third, first, and second polarizers 30, 50, and 60 have the same configuration.

The polarizing layer 41 is formed using PVA as a principal component and impregnating it, for example, with an iodine (I) compound. The polarizing layer 41 has a thickness t1 of, for example, 20 μm. The protective layers 42 are formed with TAC (which may hereinafter be referred to as "the TACs 42"), and have a thickness t2 of, for example, 40 μm. The TACs 42 are hydrophobic, and therefore is prone to absorb moisture. When moisture is absorbed, the TACs 42 expand. To protect the polarizing layer 41 from ultraviolet rays, on the other hand, the TACs 42 are required to absorb ultraviolet rays. It is therefore necessary for the TACs 42 to have a certain amount of thickness. The self-adhesive layer 43 is required to have a thickness to retain a sufficient bonding force with the second counter substrate 500, so that its thickness t3 is, for example, 25 μm. The thickness of the fourth polarizer 40 alone is therefore approximately 125 μm.

On the other hand, the thickness of the OCA 70 is, for example, 150 μm. Accordingly, the total thickness of the OCA 70 and the two polarizers 40 and 50 is approximately 400 μm, so that, as indicated by the open thick arrow M in FIGS. 2 and 3, moisture is prone to penetrate from their side surfaces. A part that includes the polarizers 40 and 50, and the OCA 70 may hereinafter be referred to as "the adhered part." This adhered part is covered at an upper surface and lower surface thereof with the first TFT substrate 100 and the second counter substrate 500, both of which are made from glass. The penetrated moisture therefore stays in the adhered part.

This means that the polarizing layers 41 of the polarizers 40 and 50 are always exposed to moisture. PVA that makes up the polarizing layers 41 is hydrolyzed and changed in quality in the presence of moisture. Described specifically, the transmittance of the polarizing layers 41 is made uneven or is reduced. The hydrolysis is further accelerated under heat. The adhered part is exposed to heat from the backlight 1000. The polarizing layers 41 are therefore exposed to a severe environment, and their deterioration proceeds. This deterioration significantly affects the service life of the liquid crystal display device.

The present invention can solve such a problem as described above.

Figure 5:
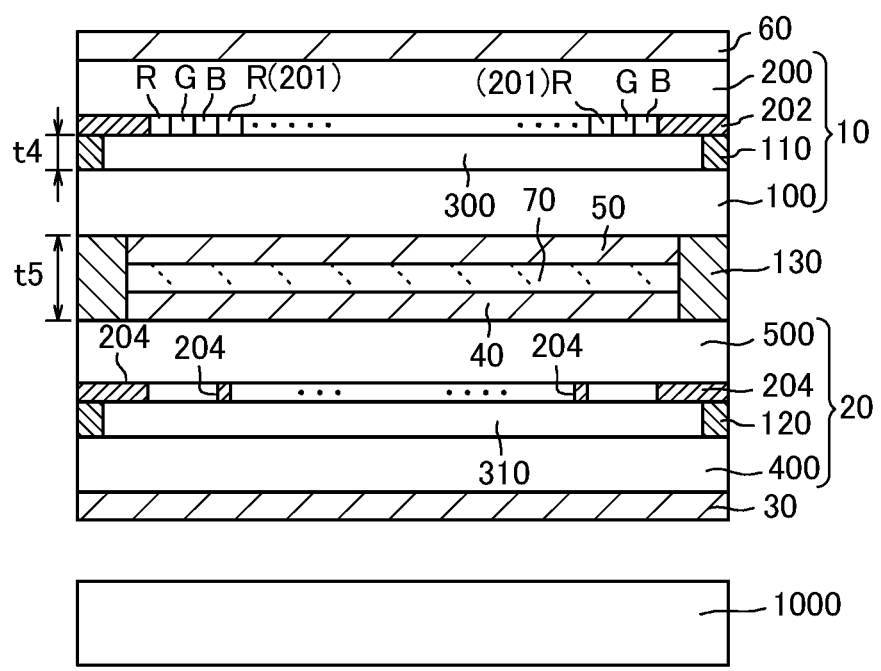
FIG. 5 is a cross-sectional view of a liquid crystal display device according to a first embodiment of the present invention.

A liquid crystal display device according to the first embodiment of the present invention will hereinafter be described with reference to FIGS. 5 to 8. In addition, first and second examples of a process for forming a third sealing layer of the liquid crystal display device according to the first embodiment of the present invention will hereinafter also be described with reference to FIGS. 9 to 11 and FIGS. 12 to 14, respectively. It is to be noted that in FIGS. 5 to 14, the same elements as those in FIGS. 1 to 4 are identified by the same reference numerals, and their description is omitted. FIG. 5 is a cross-sectional view of the liquid crystal display device according to the first embodiment. FIG. 5 corresponds to the III-III cross-sectional view of FIG. 1, that is, FIG. 3. FIG. 5 is substantially different from FIG. 3 in that the adhesion between the display panel 10 and the brightness control panel 20 is achieved by a third sealing layer 130. The sealing layer in this adhered part will hereinafter be referred to as "the third sealing layer 130," while the sealing layer used for the adhesion between the first TFT substrate 100 and the first counter substrate 200 and the like in the display panel 10 will hereinafter be referred to as "the first sealing layer 110," and the sealing layer used for the adhesion between the second TFT substrate 400 and the second counter substrate 500 and the like in the brightness control panel 20 will hereinafter be referred to as "the second sealing layer 120."

A characteristic feature of the liquid crystal display device of the first embodiment shown in FIG. 5 is that the fourth polarizer 40, adhesive layer 70, and first polarizer 50 are protected from moisture in the outside air by the third sealing layer 130. The third sealing layer 130 may be formed from a similar material as the first sealing layer 110 and the second sealing layer 120. As the material of these sealing layers, an epoxy-based resin or an acrylic resin is preferably used. Still more preferably for the convenience of manufacturing, for the third sealing layer 130, a resin for which ultraviolet (UV) curing and heat curing can be used in combination may be used. Examples of the resin for which ultraviolet (UV) curing and heat curing can be used in combination include resins formed by partially adding acrylate units to epoxy groups of epoxy-based resins, in other words, so-called partially acrylated epoxy resins and the like. Similar to the first sealing layer 110 and second sealing layer 120, a resin that hardly allows permeation of moisture is also used for the third sealing layer 130.

It is the thickness that is significantly different between the first and second sealing layers 110 and 120 and the third sealing layer 130. The first and second sealing layers 110 and 120 have a thickness t4 equal to the thickness of the first and second liquid crystal layers 300 and 310, specifically, of approximately 3 μm, while the third sealing layer 130 has a thickness t5 of, for example, approximately 400 μm because the third sealing layer 130 encloses the two polarizers 40 and 50 and the OCA 70 on an inner side thereof.

Figure 6:
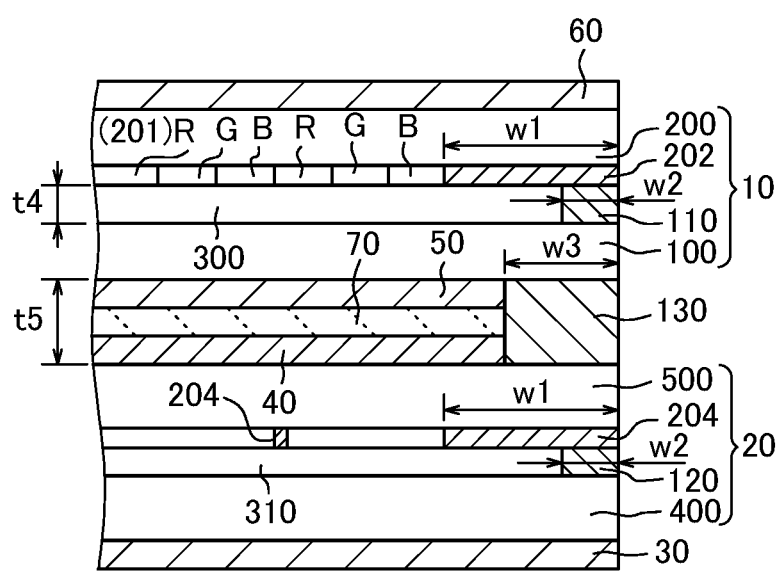
FIG. 6 is an enlarged fragmentary cross-sectional view of an adhered, in other words, sealed part of the liquid crystal display device of FIG. 5.

FIG. 6 is an enlarged fragmentary cross-sectional view showing on an enlarged scale the first to third sealing layers 110, 120, and 130 of FIG. 5. In FIG. 6, the first and second light shielding layers 202 and 204 that define the frame areas of the display panel 10 and brightness control panel 20, respectively, have the same width w1. The first and second sealing layers 110 and 120 have the same width w2 and the same thickness t4. The width w2 is formed to be small, and is 1 mm or smaller in many instances. The third sealing layer 130 that is for protecting the OCA 70 and the two polarizers 40 and 50 from the external environment has a width w3 and a thickness t5.

The width w3 of the third sealing layer 130 is formed to be greater than the width W2 of the first and second sealing layers 110 and 120 to ensure the retention of a sufficient adhesive force. The third sealing layer 130 is large in the thickness t5, and therefore is large in cross-sectional area, so that the third sealing layer 130 is prone to allow the permeation of moisture correspondingly. It is hence also necessary for third sealing layer 130 to make moisture take a longer time to permeate it by forming the width w3 greater than the width w2 of the first and second sealing layers 110 and 120.

It is however necessary to form the width w3 of the third sealing layer 130 smaller than the width w1 of the first and second light shielding layers 202 and 204 that define the frame areas, respectively. There is hence a relation of w1>w3>w2. There is also a relation of (the thickness t4 of the first and second sealing layers 110 and 120)<(the thickness t5 of the third sealing layer 130).

Figure 7:
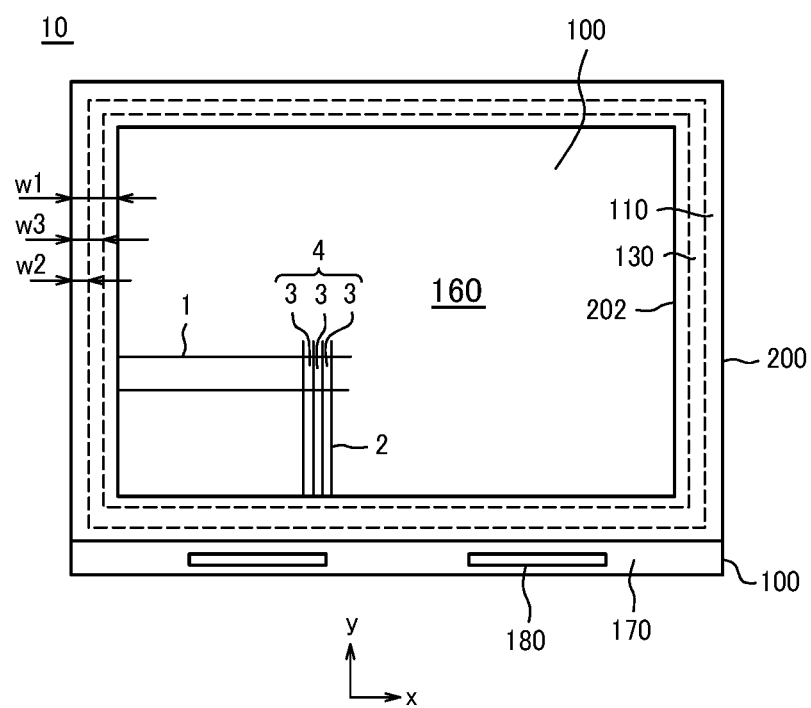
FIG. 7 is a plan view of a liquid crystal display panel of the liquid crystal display device of FIG. 5.

FIG. 7 is a plan view of the display panel 10 of FIG. 5. In FIG. 7, the first TFT substrate 100 and the first counter substrate 200 are adhered together with the first sealing layer 110. On a portion of the first counter substrate 200 where the first TFT substrate 100 and the first counter substrate 200 overlap each other, a display area 160 is formed, and a portion of the TFT substrate 100 where the TFT substrate 100 does not overlap the first counter substrate 200 is a first terminal area 170. At the first terminal area 170, two first driver ICs 180 are arranged. At the first terminal area 170, a number of terminals is formed, and a flexible wiring substrate is connected to these terminals to supply power and signals to the display panel 10. These terminals and flexible wiring substrate are however omitted in FIG. 7.

In FIG. 7, the part without the frame area serves as the display area 160, and the width w1 of the frame area is defined by the first light shielding layer 202. The width of the first sealing layer 110 is w2. The third sealing layer 130 is formed on a lower side of the first TFT substrate 100, and its width is w3.

At the display area 160, scanlines 1 extend in a transverse direction (x-direction), and are aligned in a vertical direction (y-direction). Video signal lines 2 extend in the vertical direction, and are aligned in the transverse direction. At areas surrounded by the scanlines 1 and the video signal lines 2, subpixels 3 are formed. To each subpixel 3, any one of red color filters 201R, green color filters 201G, and blue color filters 201B (see FIG. 5) formed on the first counter substrate 200 corresponds. Each pixel 4 is configured with three subpixels 3. It is to be noted that on the first counter substrate 200, the first light shielding layers 202 are formed corresponding to wirings to prevent reflection of light from the wirings.

Figure 8:
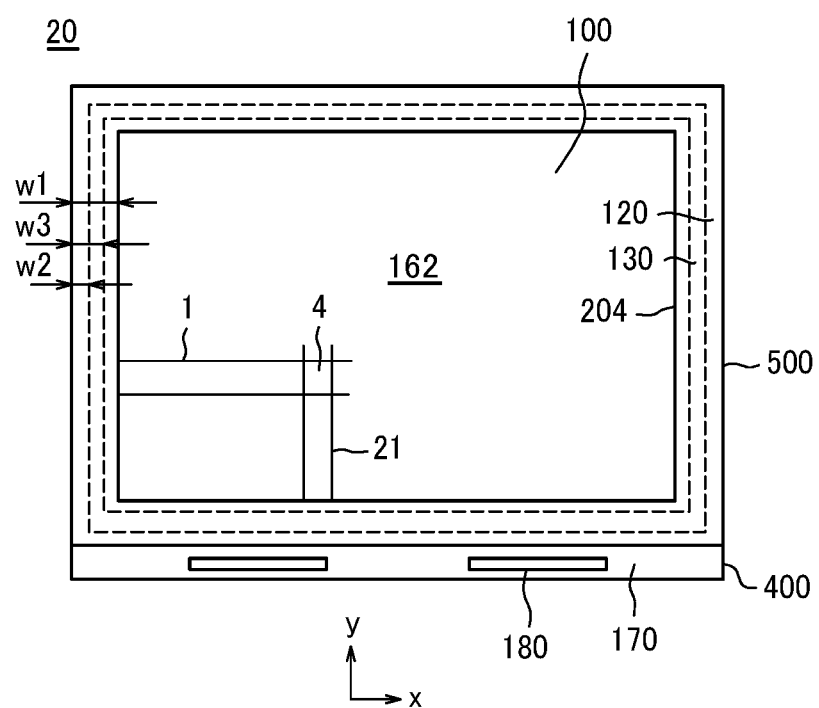
FIG. 8 is a plan view of a brightness control panel of the liquid crystal display device of FIG. 5.

FIG. 8 is a plan view of the brightness control panel 20. The brightness control panel 20 has the same configuration as the display panel 10 except for some portions. In FIG. 8, the second TFT substrate 400 and the second counter substrate 500 are adhered together with the second sealing layer 120. At a display area 162, scanlines 1 extend in the transverse direction (x-direction), and are aligned in the vertical direction (y-direction). Further, video signal lines 21 extend in the vertical direction, and are aligned in the transverse direction. At areas surrounded by the scanlines 1 and the video signal lines 2, pixels 4 are formed.

In FIG. 8, the pitch in the transverse direction of brightness signal lines 21 is three times the pitch in the transverse direction of the video signal lines 2 in FIG. 7, and no subpixels are formed in FIG. 8. In addition, no color filters are formed on the second counter substrate 500 of the brightness control panel 20 to increase the light transmittance. In the brightness control panel 20, however, the second light shielding layers 204 are also formed, on the second counter substrate 500, corresponding to the scanlines 1 and brightness signal lines 21 formed on the second TFT substrate 400. These second light shielding layers 204 are for preventing the reflection of light from the wirings.

In FIGS. 7 and 8, the video signal lines 2 and the brightness signal lines 21 both linearly extend in the vertical direction, that is, in the y-direction, but may extend in a zig-zag pattern depending on the product. In many instances, the zig-zag pattern is changed between the video signal lines 2 in the display panel 10 and the brightness signal lines 21 in the brightness control panel 20.

In FIG. 8, the width w1 of the second light shielding layer 204 that defines the frame area, the width w2 of the second sealing layer 120 that adheres the second TFT substrate 400 and the second counter substrate 500 together, and the width w3 of the third sealing layer 130 that adheres the brightness control panel 20 and the display panel 10 together satisfy the following relation: w1>w3>w2 as in the display panel 10 of FIG. 7. However, the third sealing layer 130 is formed on the second counter substrate 500 of the brightness control panel 20 (see FIG. 5).

According to the configurations of the first embodiment shown in FIGS. 5 to 8, the penetration of moisture from the external environment can be prevented by the third sealing layer 130 as described above, and therefore the fourth polarizer 40, fifth polarizer 50, and OCA 70 can be prevented from absorbing moisture. It is therefore possible to prevent the deterioration of the polarizing layers 41 (see FIG. 4) of the polarizers 40 and by moisture and to prolong the service life of the liquid crystal display device.

Figure 9:
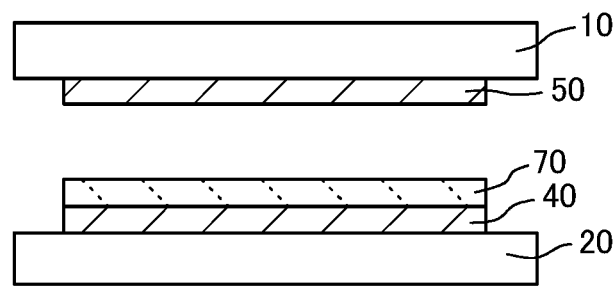
FIG. 9 is a cross-sectional view showing a first step of a first example of a process for forming a third sealing layer of the liquid crystal display device of FIG. 5.
Figure 10:
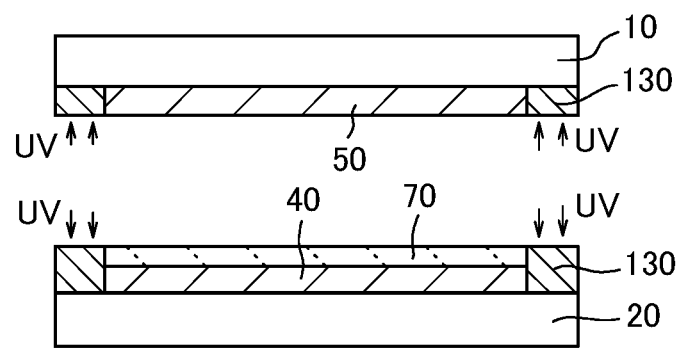
FIG. 10 is a cross-sectional view showing a second step that follows the first step of FIG. 9.
Figure 11:
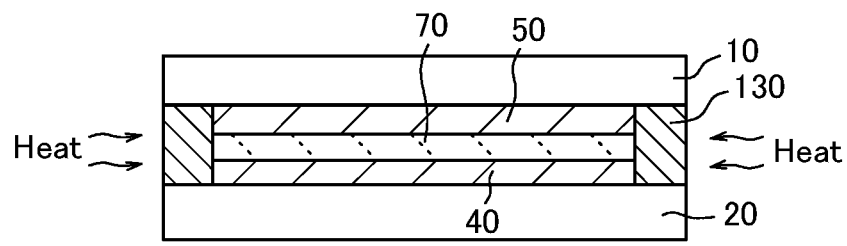
FIG. 11 is a cross-sectional view showing a third step that follows the second step of FIG. 10.

It is to be noted that the thickness of the third sealing layer 130 is very large compared with the thickness of the first sealing layer 110 and second sealing layer 120. A situation may therefore arise where the third sealing layer 130 cannot be formed in a similar manner as for the first sealing layer 110 and second sealing layer 120. FIGS. 9 to 11 are cross-sectional views showing first to third steps of a first example of a process for forming the third sealing layer 130.

FIG. 9 shows the first step of the first example. In FIG. 9, the first polarizer 50 is adhered to a lower surface of the display panel 10, and the fourth polarizer and OCA 70 are adhered to an upper surface of the brightness control panel 20. The OCA 70 may be adhered to the first polarizer 50 on the side of the display panel 10. The fourth polarizer 40, first polarizer 50, and OCA 70 have outer profiles shaped smaller than those of the display panel 10 and brightness control panel 20.

FIG. 10 shows the second step that follows the first step of FIG. 9. In FIG. 10, a resin for the third sealing layer 130 is applied from dispensers or by screen printing to a periphery of the display panel 10, in other words, a portion of the display panel 10 where the first polarizer 50 does not exist. Further, the resin for the third sealing layer 130 is also applied from dispensers or by screen printing to a periphery of the brightness control panel 20, in other words, a portion of the brightness control panel 20 where the fourth polarizer 40 and OCA 70 do not exist.

For the formation of the third sealing layers 130, a resin for which UV curing and heat curing can be used in combination, for example, an acrylated epoxy resin can be used. As shown in FIG. 10, after the resin for the third sealing layer 130 has been applied to both the periphery of the display panel 10 and the periphery of the brightness control panel 20, the resin can be provisionally cured by being irradiated with ultraviolet rays.

FIG. 11 shows the third step that follows the second step of FIG. 10. As shown in FIG. 11, the display panel 10 and the brightness control panel 20 are then adhered together with the provisionally cured third sealing layers 130, followed by heat curing. According to this first example, the resin for the third sealing layer 130 is separately applied in two portions, one to the side of the display panel 10, and the other to the side of the brightness control panel 20, so that the third sealing layer 130 can be formed with good accuracy even if it has a large thickness. In addition, the fourth polarizer 40, first polarizer 50, and OCA 70 play a role as a spacer. Dispersion of a filler of very large particle size in the third sealing layer 130 is hence not needed, although such a filler would otherwise be needed to allow the third sealing layer 130 to act as a spacer.

Figure 12:
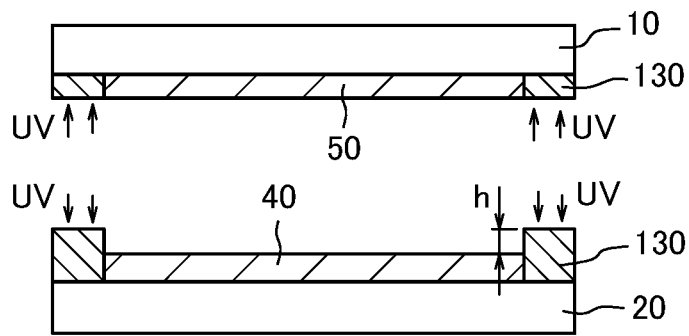
FIG. 12 is a cross-sectional view showing a first step of a second example of the process for forming the third sealing layer of the liquid crystal display device of FIG. 5.
Figure 13:
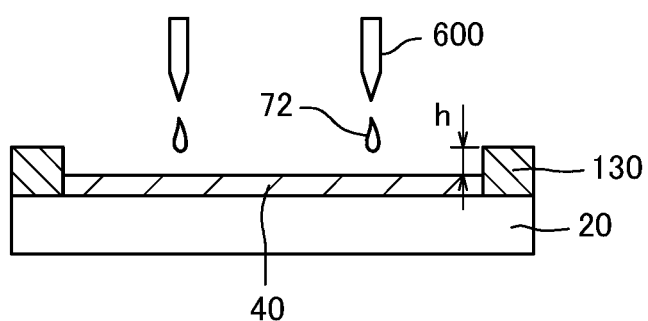
FIG. 13 is a cross-sectional view showing a second step that follows the first step of FIG. 12.
Figure 14:
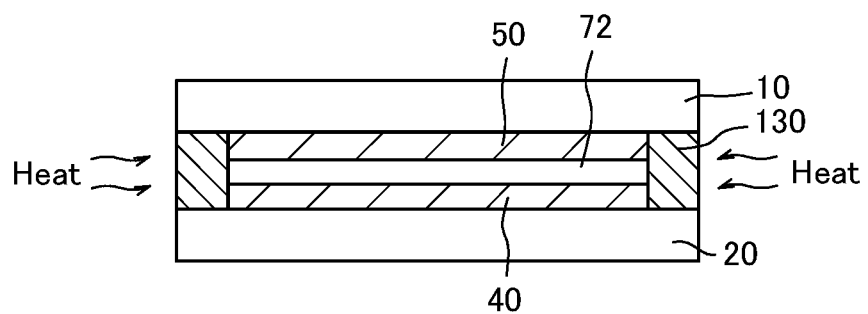
FIG. 14 is a cross-sectional view showing a third step that follows the second step of FIG. 13.

In the above-described first example of the process for forming the third sealing layer 130 as shown in FIGS. 9 to 11, OCA is used for the adhesive layer 70 that adheres the fourth polarizer 40 and the first polarizer 50 together. Without being limited to OCA, however, it may be configured to use a liquid adhesive and then to cure it. FIGS. 12 to 14 are cross-sectional views showing first to third steps of the second example of the process for forming the third sealing layer 130 of the liquid crystal display device of FIG. 5. For the formation of the third sealing layer 130 in the second example, a resin for which UV curing and heat curing can be used in combination, for example, an acrylated epoxy resin or the like is used as in the first example.

Before performing the first step of FIG. 12, the first polarizer 50 has been adhered to the lower surface of the display panel 10, and the fourth polarizer 40 has adhered to the upper surface of the brightness control panel 20. As shown in FIG. 12, a resin for the third sealing layer 3 is then applied from dispensers or by screen printing to the periphery of the display panel 10, in other words, a portion of the display panel 10 where the first polarizer 50 does not exist. Further, the resin for the third sealing layer 130 is also applied from dispensers or by screen printing to the periphery of the brightness control panel 20, in other words, a portion of the brightness control panel 20 where the fourth polarizer 40 and OCA 70 do not exist.

On the side of the brightness control panel 20 in FIG. 12, the height of the third sealing layer 130 is set to be greater by a predetermined amount h than that of the fourth polarizer 40. This is to ensure formation of a space, in other words, a cavity on the inner side of the third sealing layer 130 and on the fourth polarizer 40 for use in pouring an adhesive, for example, an optical clear resin (OCR) 72 (see FIG. 13). The above-described predetermined amount h is, for example, 100 μm. In FIG. 12, the resin for the third sealing layer 130 on the side of the display panel 10 and the resin for the third sealing layer 130 on the side of the brightness control panel 20 are irradiated with ultraviolet rays to be provisionally cured.

FIG. 13 shows the second step that follows the first step of FIG. 12. Described specifically, FIG. 13 shows how, on the side of the brightness control panel 20, OCR 72 is poured by a one drop fill (ODF) method into the cavity formed by the third sealing layer 130 provisionally cured by the irradiation of ultraviolet rays as described above and having a depth h corresponding to the above-described predetermined amount h. From a plurality of dispensers 600, a calculated amount of the OCR 72 is dropped. OCRs include silicone-based OCRs and acrylic OCRs, each of which is of the UV curing type and also of the heat curing type.

FIG. 14 shows the third step that follows the second step of FIG. 13. As shown in FIG. 14, the display panel 10 and the brightness control panel 20 are adhered together with the provisionally cured third sealing layers 130, followed by heat curing. At this time, the OCR 72 and the third sealing layer 130 are concurrently subjected to heat curing. In this second example, the resin for the third sealing layer 130 is separately applied in two portions, one to the side of the display panel 10, and the other to the side of the brightness control panel 20, so that the third sealing layer 130 can be formed with good accuracy even if it has a large thickness. In addition, the third sealing layer 130 semi-cured by ultraviolet rays can be used as a spacer when adhering the display panel 10 and the brightness control panel 20 together. Dispersion of a filler of very large particle size in the third sealing layer 130 is hence not needed, although such a filler would otherwise be needed to allow the third sealing layer 130 to act as a spacer. It is to be noted that ODF can also be performed on the side of the display panel 10 although ODF is performed on the side of the brightness control panel 20 in the second step.

According to the first embodiment, the fourth polarizer 40, the adhesive layer 70 or 72 formed by the heat curing of the OCA or OCR, and the first polarizer 50 can be protected from moisture in the adhered part of the display panel 10 and the brightness control panel 20 as described above. The liquid crystal display device according to the first embodiment is therefore excellent in contrast and high in reliability.

Figure 15:
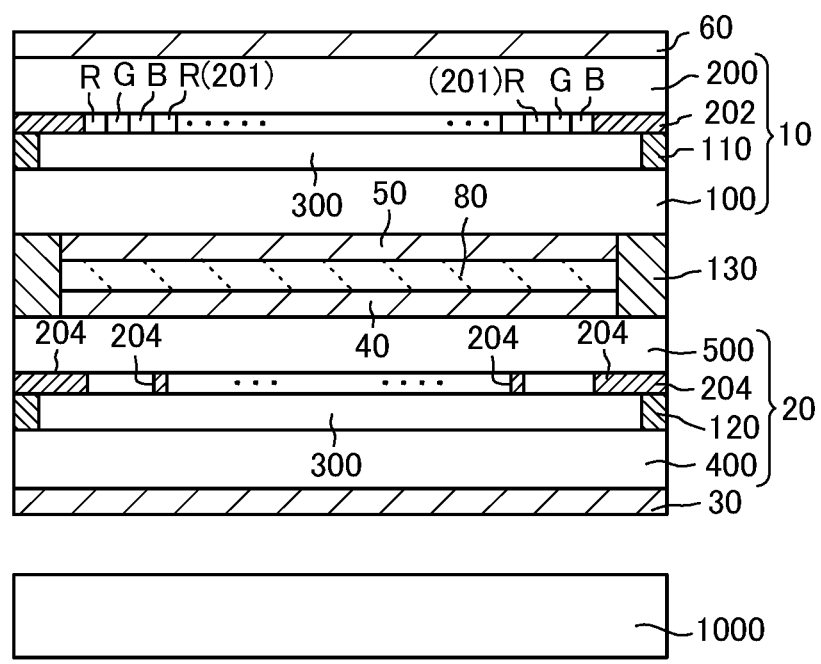
FIG. 15 is a cross-sectional view of a liquid crystal display device according to a second embodiment of the present invention.

FIG. 15 is a cross-sectional view of a liquid crystal display device according to the second embodiment of the present invention. In FIG. 15, the same elements as those in FIG. 5 are identified by the same reference numerals, and their description is omitted. In the above-described first embodiment, the OCA or OCR is used as the adhesive layer 70 to 72 along with the third sealing layer 3 in the adhered part of the display panel 10 and the brightness control panel 20. To allow the OCA or OCR to exhibit its function as an adhesive layer, a certain amount of thickness is needed. In the second embodiment, the third sealing layer 130 is assigned with a role to adhere the display panel 10 and the brightness control panel 20 together, and, for example, a high refractive oil 80 is used as a layer, which is assigned with only a role for optical coupling, instead of an adhesive layer between the fourth polarizer 40 and the first polarizer 50.

The display panel 10 and brightness control panel 20 have the same configurations as in the first embodiment. It is the use of the high refractive oil 80 instead of the OCA 70 between the fourth polarizer 40 and the first polarizer 50 that FIG. 15 is different from FIG. 5 of the first embodiment. The high refractive oil 80 is sealed by the third sealing layer 130. As no adhesive function is needed for the high refractive oil 80, the layer of the high refractive oil 80 can be formed with as small a thickness as possible to an extent that can form the layer as a uniform layer, and may be, for example, 5 μm.

The high refractive oil 80 is used with a purpose of improving the optical coupling between the brightness control panel 20 and the display panel 10, specifically the optical coupling between the fourth polarizer 40 and the first polarizer 50.

As the layer of the high refractive oil 80 can be formed to be thin, the disparity due to parallax between the display panel 10 and the brightness control panel 20 can be reduced compared with the use of the adhesive layer 70 or 72 of the OCA or OCR in the first embodiment. Owing to the small layer thickness, the high refractive oil 80 can also reduce the amount of moisture to be contained therein. In addition, the thickness of the third sealing layer 130 can also be reduced by making thinner the layer of the high refractive oil 80. The amount of moisture that would permeate through the third sealing layer 130 can also be decreased. Moreover, it is possible to choose, as a high refractive oil, a material that absorbs moisture in a smaller amount than the OCA or the like. Accordingly, the deterioration of the polarizing layers of the fourth polarizer 40 and first polarizer 50 in the presence of moisture can also be reduced further.

In view of the refractive index of glass used as the TFT substrates and counter substrates and the refractive index of the polarizers, the refractive index of the high refractive oil 80 is preferably 1.43 to 1.55 or so, with 1.48 to 1.52 being more preferred. As such a high refractive oil, immersion oil can be exemplified. Immersion oil is used, for example, by filling it between an objective lens and a cover glass to substantially increase the aperture ratio of the lens. As immersion oil, a variety of products is marketed from diverse optical equipment manufacturers. The refractive index of immersion oil is 1.52 in general.

As a process that enables the formation of the third sealing layer 130 of the liquid crystal display device according to the second embodiment shown in FIG. 15, it is possible to use a process similar to the second example of the process for forming the third sealing layer 130 of the liquid crystal display device according to the first embodiment. In the second embodiment, the thickness of the layer of the high refractive oil 80 is smaller compared with the thickness of the adhesive layer 70 or 72 of OCA or OCR in the first embodiment, and can therefore be set to be smaller than the depth h in FIG. 13. This can correspondingly facilitate the manufacture of the liquid crystal display device of the second embodiment.

As described above, the liquid crystal display device according to the second embodiment can form high contrast images, and can be provided with high reliability.

What is claimed is:

1. A liquid crystal display device comprising:
   a first liquid crystal panel with a first thin-film transistor substrate and a first counter substrate adhered together with a first sealing layer;
   a first polarizer bonded to a lower surface of the first liquid crystal panel;
   a second polarizer bonded to an upper surface of the first liquid crystal panel;
   a second liquid crystal panel with a second thin-film transistor substrate and a second counter substrate adhered together with a second sealing layer;
   a third polarizer bonded to a lower surface of the second liquid crystal panel; and
   a fourth polarizer bonded to an upper surface of the second liquid crystal panel,
   the first liquid crystal panel and the second liquid crystal panel being arranged overlapping each other, wherein
   the second counter substrate and the first thin-film transistor substrate are adhered together at peripheral portions thereof with a third sealing layer,
   the first polarizer and the fourth polarizer are arranged on an inner side of the third sealing layer, and the first polarizer and the fourth polarizer are adhered together with an adhesive layer, and
   the third sealing layer is greater in thickness than the first sealing layer and the second sealing layer.

2. The liquid crystal display device according to claim 1, wherein the adhesive layer is an optical clear adhesive.

3. The liquid crystal display device according to claim 1, wherein the adhesive layer is an optical clear resin.

4. The liquid crystal display device according to claim 1, wherein the third sealing layer is formed of a same material as the first sealing layer and the second sealing layer.

5. The liquid crystal display device according to claim 1, wherein the third sealing layer is greater in width than the first sealing layer and the second sealing layer.

6. The liquid crystal display device according to claim 1, further comprising:
   frame areas formed by a first light shielding layer and a second light sealing layer, along a periphery of a display area of the first liquid crystal panel and a periphery of a display area of the second liquid crystal panel, wherein the frame areas are greater in width than the third sealing layer.

7. The liquid crystal display device according to claim 1, wherein the first liquid crystal panel is a display panel, and the second liquid crystal panel is a brightness control panel.

8. A liquid crystal display device comprising:
a first liquid crystal panel with a first thin-film transistor substrate and a first counter substrate adhered together with a first sealing layer;
a first polarizer bonded to a lower surface of the first liquid crystal panel;
a second polarizer bonded to an upper surface of the first liquid crystal panel;
a second liquid crystal panel with a second thin-film transistor substrate and a second counter substrate adhered together with a second sealing layer;
a third polarizer bonded to a lower surface of the second liquid crystal panel; and
a fourth polarizer bonded to an upper surface of the second liquid crystal panel,
the first liquid crystal panel and the second liquid crystal panel being arranged overlapping each other, wherein
the second counter substrate and the first thin-film transistor substrate are adhered together at peripheral portions thereof with a third sealing layer,
the first polarizer and the fourth polarizer are arranged on an inner side of the third sealing layer, and a high refractive oil exists between the first polarizer and the fourth polarizer, and
the third sealing layer is greater in thickness than the first sealing layer and the second sealing layer.

9. The liquid crystal display device according to claim 8, wherein the high refractive oil has a refractive index of 1.43 to 1.55.

10. The liquid crystal display device according to claim 8, wherein the high refractive oil has a refractive index of 1.48 to 1.52.

11. The liquid crystal display device according to claim 8, wherein the high refractive oil is an immersion oil.

12. The liquid crystal display device according to claim 8, wherein the third sealing layer is formed of a same material as the first sealing layer and the second sealing layer.

13. The liquid crystal display device according to claim 8, wherein the third sealing layer is greater in width than the first sealing layer and the second sealing layer.

14. The liquid crystal display device according to claim 8, further comprising:
frame areas formed by a first light shielding layer and a second light sealing layer, along a periphery of a display area of the first liquid crystal panel and a periphery of a display area of the second liquid crystal panel, wherein
the frame areas are greater in width than the third sealing layer.

15. The liquid crystal display device according to claim 8, wherein the first liquid crystal panel is a display panel, and the second liquid crystal panel is a brightness control panel.

* * * * *